United States Patent

Nelson et al.

[15] 3,650,357
[45] Mar. 21, 1972

[54] DISC BRAKE WITH HOMOGENEOUS BRAKE STACK

[72] Inventors: John P. Nelson; Joseph F. Dernovshek; Hal E. Miller, all of Akron; Clifton A. Byers, Cuyahoga Falls, all of Ohio

[73] Assignee: The Goodyear Tire & Rubber Company, Akron, Ohio

[22] Filed: May 8, 1969

[21] Appl. No.: 833,836

Related U.S. Application Data

[63] Continuation-in-part of Ser. No. 739,836, June 25, 1968, abandoned.

[52] U.S. Cl. .................. 188/71.5, 188/73.2, 188/251 R, 192/70.2, 192/107 M, 287/53 SS
[51] Int. Cl. .................................................. F16d 55/36
[58] Field of Search ............ 188/251 R, 251 M, 251 A, 218, 188/71.5, 73.2; 192/107 M, 70.19, 70.20; 287/53 SS

[56] References Cited

UNITED STATES PATENTS

| 2,379,767 | 7/1945 | Valentine | 188/251 M X |
| 3,237,731 | 2/1966 | Du Bois | 188/218 |
| 3,261,440 | 7/1966 | Graham et al. | 188/251 X |
| 3,452,844 | 7/1969 | Lallemant | 188/218 |
| 2,542,545 | 2/1951 | Lyman | 188/73.2 |

Primary Examiner—George E. A. Halvosa
Attorney—F. W. Brunner, P. E. Milliken and Oldham & Oldham

[57] ABSTRACT

A lightweight disc brake utilizing homogeneous brake discs to provide heat absorbing characteristics superior to steel. The brake discs are made from graphite and/or carbon materials where the graphite and/or carbon acts as the primary heat sink and with the graphite-carbon disc itself acting as the basic friction material. The discs are preferably in the shape of flat annular rings. Straps may be utilized in a segmented design or to reinforce drive lugs for torque transmittal. Strengthening and anti-oxidizing agents can be added to the discs.

20 Claims, 9 Drawing Figures

Patented March 21, 1972 3,650,357
2 Sheets-Sheet 1
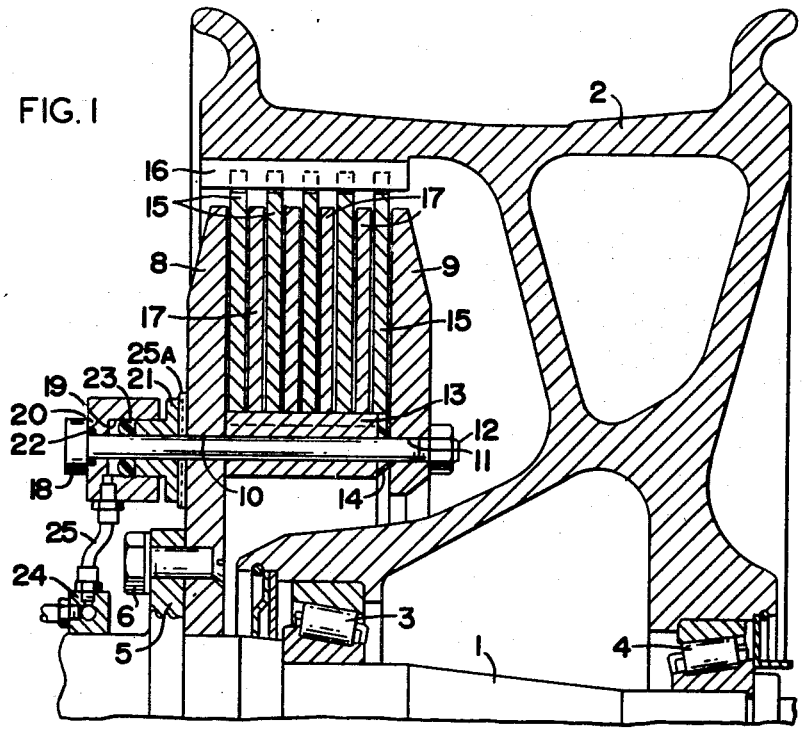
FIG. 1
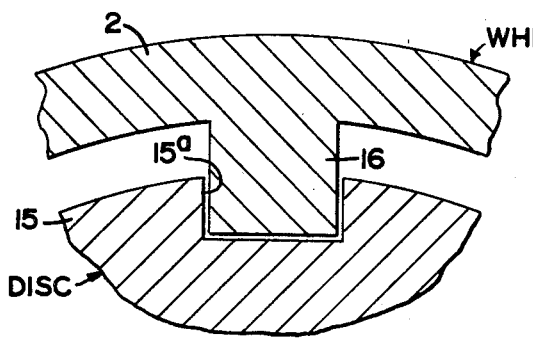
FIG. 2 — WHEEL / DISC
FIG. 3 — DISC / AXLE
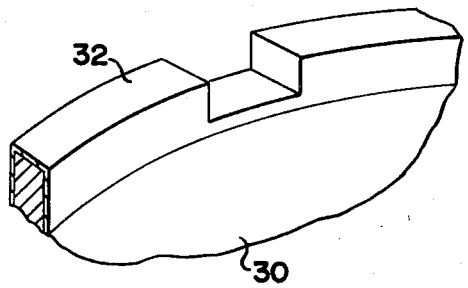
FIG. 4
INVENTORS
JOHN P. NELSON
JOSEPH F. DERNOVSHEK
HAL E. MILLER
CLIFTON A. BUYERS
BY Oldham & Oldham
ATTORNEYS.

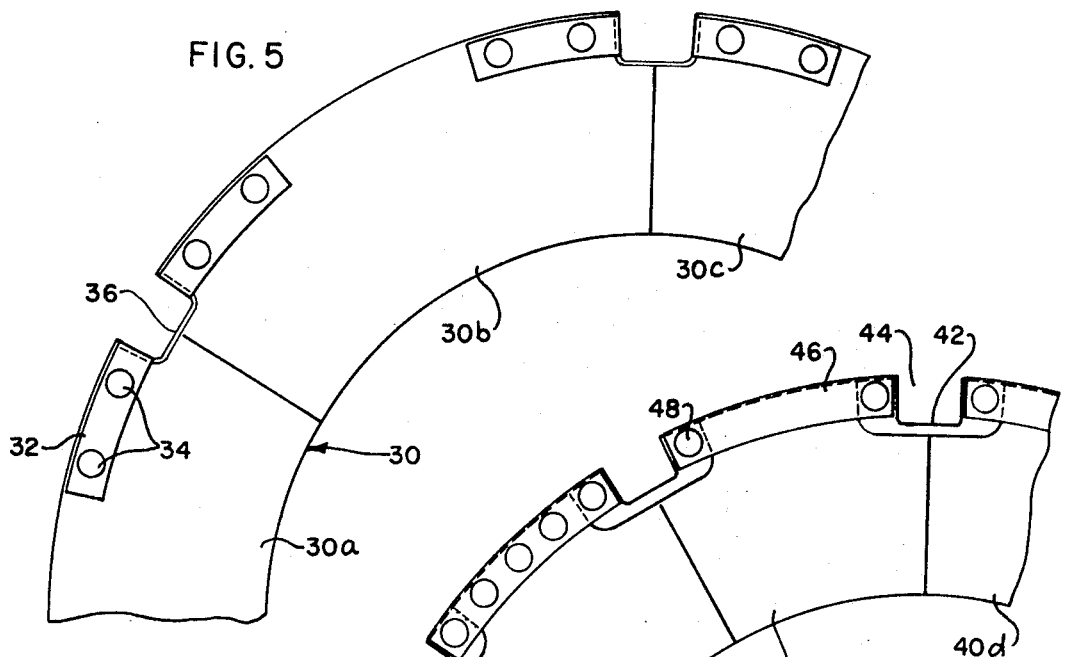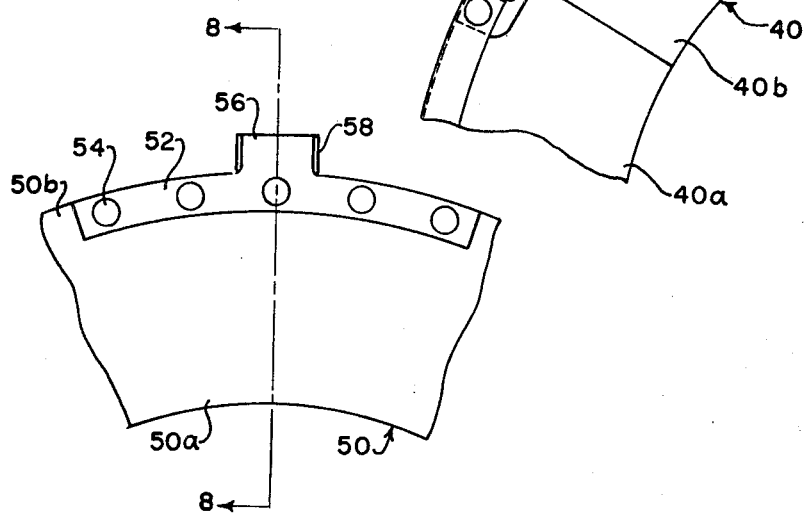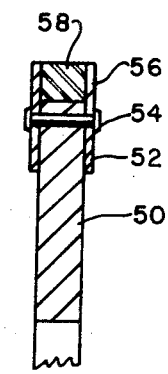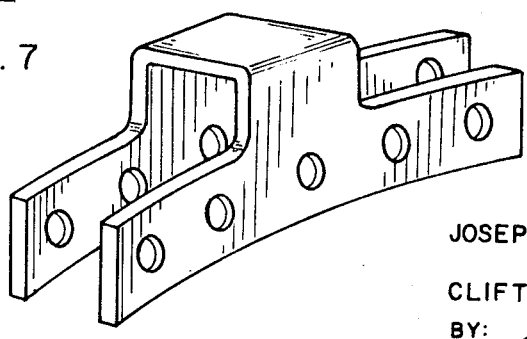

DISC BRAKE WITH HOMOGENEOUS BRAKE STACK

This application is a continuation-in-part of application Ser. No. 739,836, filed June 25, 1968 and now abandoned.

Thermal stress caused by thermal gradients is the primary cause of disc failure in multi-disc brakes, and many attempts have been made to improve the friction materials and/or the heat sink characteristics of disc brakes. High heat input caused by the high aircraft deceleration requirements at high speeds and under great loads results in thermal stress and often causes failure of discs by dishing or cracking, and hence brake failure and a resulting unsafe operation condition.

The general object of the invention is to avoid and overcome the foregoing and other difficulties of and objections to prior art practices by the provision of a homogeneous stack of discs in a disc brake where each disc is light in weight, has high heat sink characteristics and also excellent properties of friction with respect to adjacent discs so that heat dissipation occurs rapidly and brake reliability remains extremely high.

A further object of the invention is to provide a stack of discs in a disc brake which are made from a graphite/carbon mixture to provide a combination of light weight high heat sink, low thermal expansion and good frictional braking characteristics.

The aforesaid objects of the invention and other objects which will become apparent as the description proceeds are achieved by providing in a disc brake the combination of a rotatable body, a fixed axle rotatably supporting the body, a stack of discs splined in interleaved alternating relation between the axle and the body, and means to press the discs together which is characterized by the discs being homogeneous and made from a carbon-based material having a high specific heat, low density, low thermal expansion properties, and good frictional stability between adjacent discs over a wide range of loading characteristics.

For a better understanding of the invention reference should be had to the accompanying drawings wherein:

FIG. 1 is a sectional view of a wheel and axle with a brake embodying the present invention, parts being broken-away and parts shown in section;

FIG. 2 is an enlarged, broken-away, cross-sectional illustration of a disc in splined relationship to the wheel;

FIG. 3 is an enlarged, broken-away, cross-sectional illustration of a disc in splined relation to the hub or axle;

FIG. 4 is a perspective view of a modified embodiment of the invention which utilizes anti-oxidizing coating;

FIG. 5 is a side elevational view of a modified embodiment of the disc utilizing metallic straps reinforcing the torque carrying notches and also showing a segmented construction to the disc itself;

FIG. 6 is an elevational view of another modification showing a metallic strap and segmented construction similar to FIG. 5;

FIG. 7 is an elevational view of a metallic strap arranged to the disc to form a driving lug;

FIG. 8 is a vertical cross-sectional view taken on line 8—8 of FIG. 7; and

FIG. 9 is a perspective illustration of a strap to form a driving lug which is a modification of the type shown in FIG. 7.

Referring to the drawings, and, first, FIG. 1, this shows a nonrotatable axle 1, about which a wheel 2 is mounted for rotation on bearings 3 and 4. The axle is formed with a radial torque flange 5 to which a torque and pressure plate 8 is secured by bolts 6 evenly spaced thereabout. A back plate 9 is provided opposite the pressure plate 8.

The plates 8 and 9 are provided with axially aligned openings 10 and 11 at spaced intervals circumferentially thereof to receive a selected number of assembly bolts 12 spanning the space therebetween. Each bolt 12 extends through holes in a hub-like tubular torque tube 13 normally shorter than the space between the plates 8 and 9 and a spring washer or bellville-type washer 14 is placed about each bolt between one of the pressure plates and the torque tube for the purpose of holding the plates in spaced apart relation and returning them to such position after a braking action. The torque tube 13 is usually bolted by a bolt (not shown) to the torque plate 8 at points circumferentially between the bolts 12.

Between the pressure plate 8 and back plate 9 are a plurality of brake discs 15, for example, each having outer peripheral notches at spaced intervals thereabout for receiving keys 16 carried by the wheel 2, the brake discs 15 being arranged to float axially of the wheel along the keys. Also between plates 8 and 9 are secondary set of brake discs 17 alternately arranged between the brake discs 15 and having notches in their inner peripheries for keyed engagement with splines on torque tube 13 to prevent their rotation, but allowing axial flotation.

The discs 15 and 17 are each made of essentially a carbon base having high heat sink characteristics and yet sufficient frictional coefficient when rubbed against each other so as to make a homogeneous stack of discs. The term homogeneous is used to indicate that each disc making up the stack is essentially homogeneous in its composition when taken in cross section, and that each disc is essentially like every other disc, except varying perhaps in thickness or configuration due to its position in the stack. In other words no extra friction material is added to any of the discs. This does not mean that the composition of each disc is exactly uniform across any section thereof as the composition may vary across the disc, or may be laminated, or the like. The carbon base may be carbon itself, particularly in the form of graphite or amorphous carbon, or carbon compounds typical of which are the carbides, such as boron carbide, silicone carbide, and titanium carbide. Mixtures of carbon in its various forms may of course be used. In addition to the carbon base other ingredients may be used such as anti-oxidants, binders, fillers, strengthening agents, and reinforcing fibers. The carbon base may be solid and of uniform consistency throughout, it may be a laminated relationship with some fiber mesh material, for example, or it may have certain sections such as adjacent torque carrying surfaces, for example, which vary in density, make up or composition.

The characteristics of the material making up the discs is critical to the homogeneous nature of the stack and to the correct operation of the brake in combination. Specifically, the flexural strength of the material must be greater than 5,000 p.s.i., the density greater than 1.45 grams per cubic centimeter, the specific heat greater than 0.17 cal./gm./° C. across the normal operating temperature range of the discs, conductivity greater than 0.04 calories per second per square centimeter per centimeter per degree centigrade, and the friction coefficient must be greater than 0.10 under normal operating conditions. We have found in order to achieve these characteristics that a combination of graphite and carbon to a minimum of about 75 percent of the total disc volume is required. The remaining volume of the disc is made up by adding strengthening materials from a group composed of tungsten metal, silicon carbide, and other high temperature additives. Further, it is desirable to add anti-oxidizing agents from a group consisting of boron, tungsten, silicon carbide, zirconium, titantium, etc.

Anti-oxidation of the discs around the notches is necessary to prevent failure of the discs from strength degradation in this highly loaded area. Another technique to prevent oxidation failure is to coat the notches and all non-rubbing portions of the disc with an anti-oxidation coating. This is shown in FIG. 4 of the drawing where the numeral 30 indicates a brake disc of the same characteristics as described above, except an anti-oxidation coating 32 is provided to cover the entire non-rubbed surface of the disc. This coating might be applied by slurry techniques, electrolysis, electroplating, plasma spray, sputtering and vapor depositions. Typical coatings would include electrolysis nickel and electroplated chrome; electroplated nickel and chrome flash; chromium and chromium oxide; silicon carbide; silicon metal; electroplated nickel over copper; and electroplated cadmium over nickel. The coatings will be as thick as necessary, but should ranged from about 0.002 to about 0.015 inches in thickness.

The size of the notches in the discs 15 and 17 is important to obtain the performance of the homogeneous disc stack required to meet the objects of the invention. To this end, we have found that the sides of the key slot should be located to true position to within not greater than 0.010 inches but preferably within 0.004 inches. The number of key slots depends upon the disc thickness, torque required, etc., but should be determined so that bearing stress between any one slot and its key 16 is no greater than 5,000 p.s.i. during normal service operation, and does not exceed 15,000 p.s.i. during peak short time torque requirements. The opposite sides of each slot are parallel and in close fitting, flush adjacent relationship with the parallel sides of key 16. The tolerance of clearance between the sides of key 16 and the sides of notch 15a should not be greater than 0.062 inches, and preferably should be between 0.012 and 0.025 inches although this range will vary depending on the particular disc usage. The invention contemplates that there should be a minimum of four notches 15a around the outer periphery of disc 15.

Similar characteristics are present with respect to disc 17 as shown in FIG. 3 and its respective notches 17a. The splines on the hub or torque tube 13 must fit with substantially the same critical dimensional relationship as set forth with respect to discs 15 and hub 2 above. The actual physical dimensions of notches 17a will be less, however, since they are located on a radially inward surface. However, they will cover substantially the same arcuate distance in degrees as the notches 15a.

In some instances it has been found desirable to actually strengthen the torque or load bearing portions of the discs embodied in FIGS. 1–4 with something other than additives to the carbon base material. To this end, the modifications of the invention illustrated in FIGS. 5–9 will be described hereinafter.

Specifically, with respect to the embodiment shown in FIG. 5, a disc indicated generally by numeral 30 is modified by actually being broken into separate segments 30a, 30b and 30c which are easier to form, and substantially eliminate scrap material. The segments are joined together by stamped metallic straps 32 rivetted into position by rivets 34, and defining driving notches 36. In effect, the straps 32 are stamped from a single piece of metal with the notch portion 36 bent down to conform to the configuration of the respective disc segments and hold them in abutted aligned relationship as illustrated. The side flaps through which the rivets attach fit in close tolerance around the radially outer peripheral edge of the segments. It is important that the segments 30a, etc. be tightly abutted together and held in the tightly abutted relationship by the straps 32. It should also be understood that the straps 32 could be utilized with the discs of FIGS. 1–4 to strengthen the notch area and are not necessarily exclusively applicable to the segmented design illustrated in FIG. 5. However, the straps very clearly increase the torque carrying capability by distributing the torque loading over a much larger area.

FIG. 6 illustrates a slight modification from the segmented design of FIG. 5. In this embodiment, a disc indicated generally by numeral 40 comprises segments 40a, 40b, etc. In this instance, a small metallic insert 42 extends between adjacent abutted segments and defines a metallic reinforced drive notch or slot 44. A strap 46 is connected by rivets 48 between the adjacent ends of the inserts 42, thus giving a reinforced metallic edge around the entire outer peripheral surface of the disc 40. This construction is preferable where the disc segments 40a, etc. are shorter and more torque carrying capability is necessary to give strength enhancement and abuse resistance.

FIG. 7 illustrates a disc 50 which had a non-interrupted internal circumference 50a and non-interrupted external circumference 50b. A torque carrying driving lug or key is formed by a strap 52 held in place to the outer periphery by rivets 54. A pair of radially outwardly extending sides 56 cooperate with a metallic insert 58 brazed or otherwise appropriately secured into position between the sides 56 to define a driving lug or key. FIG. 8 more clearly illustrates the positioning of the insert 58 with respect to the sides 56.

FIG. 9 illustrates a single stamped strap in perspective which might be appropriately secured into position by rivets or the like on the outer circumferential edge of a disc such as disc 50 of FIG. 7, and defining the driving key or lug. This is a possible modification to the construction of FIGS. 7 and 8.

For applying braking pressure to the disc stack, any conventional means to press the plates 8 and 9 towards each other to thus slide the discs 15 and 17 into frictional braking engagement will meet the objects of the invention. One simple arrangement to this end might be the pressure applying means taught by U.S. Pat No. 3,038,559, also assigned to the same assignee as the instant application. In essence, this system utilizes a circumferential cylinder 19 formed in a collar 20 with an annular piston 21 slidably mounted about a bolt 18 within the cylinder. The cylinder and piston are mounted between the pressure plate 8 and bolt head 18. For sealing the cylinder 19, a sealing ring 22 is mounted between the collar 20 and the bolt and a sealing ring 23 is mounted against the piston 21 within cylinder 19. For providing pressure to the cylinder 19, an annular manifold 24 may be provided about axle 1 and may be supplied by a pipe from a control valve, not shown. Flexible conduits 25 individual to the cylinders 19 connect the cylinders 19 to the manifold 24.

It is thus seen that the objects of the invention have been met by providing homogeneous brake stack utilizing a light weight high heat sink material also having sufficient frictional characteristics when rubbed in relationship to each other. In effect, the disc stack of the invention utilizing the critical relationship set forth will have an enthalpy capacity about double to that of the normal steel discs. The low thermal expansion substantially eliminates thermal stress therefore overcoming the inherent characteristic problems of steel.

While in accordance with the patent statutes only one best known embodiment of the invention has been illustrated and described in detail, it is to be particularly understood that the invention is not limited thereto or thereby but that the inventive scope is defined in the appended claims.

What is claimed is:

1. A disc brake which comprises;
   a rotatable body,
   a fixed axle rotatably supporting the body,
   a stack of discs in the earth's atmosphere each having portions splined in aligned alternating relation respectively to the axle and the body, each disc characterized by being made from a carbon base material having low weight, high specific heat, and low thermal expansion properties, and having a friction coefficient of at least 0.10 between adjacent discs over the normal operating temperature range thereof, and
   reinforcing means strengthening the splined portion of each disc so that each disc is capable of transmitting torque regardless of the direction of rotation of the disc.

2. An annular brake disc having high heat sink, strength, and friction properties which is characterized by being made from a carbon base material to provide a friction coefficient of at least 0.1 when in engagement with a similar disc in the earth's atmosphere, where the specific heat is at least 0.17 cal./gm./° C., and the density is greater than 1.45 grams per cubic centimeter, but less than 2.5 grams per cubic centimeter, and which includes notches therein to receive splines to achieve transfer of torque, and where the notches have parallel sides and withstand 5,000 p.s.i. for extended periods of time and 15,000 p.s.i. for short high peak loading periods of time, and a metallic strap insert attached to the disc to extend across and strengthening each notch.

3. A disc brake which comprises:
   a rotatable body,
   a fixed axle rotatably supporting the body,
   a stack of discs associated with the axle and body in a gaseous atmosphere, each disc characterized by being made from a carbon base material having low weight, high specific heat, and low thermal expansion properties, and having a friction coefficient of at least 0.10 between adjacent discs over the normal operating temperature range thereof, reinforcing means strengthening and defining a plurality of splined portions for each disc so that each disc is splined in alternating relation respectively to the axle and the body and is capable of transmitting torque regardless of the direction of rotation of the body, and means to press the discs together.

4. A disc brake which comprises a rotatable body substantially open to a gaseous atmosphere, a fixed axle rotatably supporting the body, a stack of discs splined in alternating relation respectively to the axle and the body, and means to press the discs together which is characterized by each disc being made from a carbon-based material of substantially uniform composition in cross section having low weight, high specific heat and low thermal expansion properties, and having a friction coefficient of at least 0.10 between adjacent discs over the normal temperature operating range thereof.

5. A disc brake according to claim 1 where high temperature strengthening agents from a group including tungsten, and silicon carbide are added so as to comprise less than 25 percent by volume of the discs, and which includes an anti-oxidizing coating covering all non-rubbed portions of each disc which is from a group of materials comprising electrolysis nickel and electro-plated chrome; electro-plated nickel and chrome flash; chromium and chromium oxide; silicon carbide; silicon metal; electro-plated nickel over copper; and electro-plated cadmium over nickel.

6. A disc brake according to claim 5 where the discs are slotted to provide the splined relationship with the axle and body and where the clearances of the slots to the splines is less than 0.25 inches, and where the anti-oxidizing additive is a thin coating covering the non-rubbed surface of the disc.

7. A disc brake according to claim 6 where there are at least four slots in the discs and where each slot will have torque loading with a respective spline of the axle or body less than 5,000 p.s.i. for normal service operation, and torque loading of less than 15,000 p.s.i. for short time peak requirements.

8. A disc brake according to claim 7 which includes notches therein to receive splines to achieve torque transfer of torque, and where the notches have parallel sides and each notch will carry 5,000 p.s.i. for extended periods of time and 15,000 p.s.i. for short high peak loading periods of time, and the notches have a clearance of between 0.010 and 0.004 inches with the splines, and where the brake discs have a flexural strength greater than 5,000 p.s.i., a density greater than 1.45 grams per cubic centimeter, a specific heat of at least 0.17 cal./gm./° C., and a heat conductivity of greater than 0.04 calories per second per square centimeter per centimeter per degree centigrade.

9. An annular brake disc having high heat sink, strength and friction properties, comprising:

an annular disc of a carbon based material having torque transmitting means on one circumference thereof for engagement with complementary torque transmitting means, said means capable of transmitting torque regardless of the direction of rotation of the disc;

metallic reinforcing means strengthening the torque transmitting means of the disc, said reinforcing means having a center portion whose configuration is complementary with that of the transmitting means and fully overlying the transmitting means, said reinforcing means also having tabs extending from the center portion of the reinforcing means, the tabs overlying the sides of the disc along the circumference thereof adjacent to the transmitting means; and means securing the tabs of the reinforcing means to the disc.

10. The annular brake disc according to claim 9 wherein the torque transmitting means of the disc comprise lugs projecting from one circumference of the disc to be received in torque transmitting grooves, the center portions of the reinforcing means covering the sides and extending over the central portions of the lugs.

11. A disc brake which comprises:

a rotatable body, a fixed axle rotatably supporting the body, a stack of discs in a gaseous atmosphere each having portions splined in aligned alternating relation respectively to the axle and the body, each disc characterized by being made from a carbon base material having low weight, high specific heat, and low thermal expansion properties, and having a friction coefficient of at least 0.10 between adjacent discs over the normal operating temperature range thereof, reinforcing means strengthening the splined portion of each disc so that each disc is capable of transmitting torque regardless of the direction of rotation of the body, and means to press the discs together.

12. A disc brake according to claim 11 which includes an additive to the carbon base material making up each disc to help prevent oxidation of the discs during use.

13. A disc brake according to claim 12 which includes high temperature strengthening agents from a group including tungsten and silicon carbide added so as to comprise less than 25 percent by volume of the discs, and the anti-oxidizing agents are selected from a group consisting of boron, tungsten, silicon carbide, zirconium, and titanium.

14. An annular brake disc having high heat sink and friction properties and being lightweight which is characterized by being made from a carbon base material to provide a friction coefficient of at least 0.1 when in engagement with a similar disc in a gaseous atmosphere, where the specific heat is at least 0.17 cal./gm./° C. across the normal operating temperature range of the disc, and which includes portions therein to receive splines to achieve transfer of torque, and where the portions can withstand 5,000 p.s.i. for extended periods of time and 15,000 p.s.i. for short high peak loading periods of time, and individual reinforcing means attached to the disc to extend across and strengthen each portion for torque transfer regardless of the direction of rotation of the disc.

15. The annular brake disc according to claim 14 wherein the torque transmitting portions of the disc comprise notches in one circumference of the disc to receive torque transmitting splines, the center portions of the reinforcing means covering the sides and bottom of the notch.

16. The annular brake disc according to claim 14 further including metallic straps extending along the circumference of the disc between adjacent reinforcing means, the straps overlying a portion of the reinforcing means, and means securing to the metallic straps to the reinforcing means and to the disc.

17. The annular brake disc according to claim 14 wherein the torque transmitting portions of the disc comprise lugs projecting from one circumference of the disc to be received in splined relation in torque transmitting grooves, the center portions of the reinforcing means covering the sides and extending over the central portions of the lugs.

18. The annular brake disc according to claim 17 wherein the lugs each consist of a metallic member secured to the center portion of the reinforcing members.

19. A disc according to claim 14 having the carbon base makes up at least about 75 percent of the volume of the disc, and where the reinforcing means is a stamped metallic insert and riveted into position on the outer periphery of the disc a distance on each side of each notch at least equal to the length of the notch.

20. A disc according to claim 19 where the disc is divided into a plurality of arcuate segments held in adjacent relation butted at their ends by the metallic insert for each notch.

* * * * *

UNITED STATES PATENT AND TRADEMARK OFFICE
CERTIFICATE OF CORRECTION

PATENT NO. : B1 3,650,357

DATED : April 22, 1986

INVENTOR(S) : John P. Nelson; Joseph F. Dernovshek; Hal E. Miller and Clifton A. Byers It is certified that error appears in the above-identified patent and that said Letters Patent is hereby corrected as shown below:

Cover page, under the heading "References Cited" change "Bu Bois" --Du Bois--.

Col. 1, line 47, change "stength" to --strength--.

Col. 3, line 16, before "coefficient" insert --friction--.

Col. 4, line 3, "brake" should appear in regular print.

Signed and Sealed this

Eighteenth Day of November, 1986

Attest:

DONALD J. QUIGG

*Attesting Officer*  *Commissioner of Patents and Trademarks*

REEXAMINATION CERTIFICATE (490th)
United States Patent [19]
Nelson et al.

[11] B1 3,650,357
[45] Certificate Issued  Apr. 22, 1986

[54] DISC BRAKE WITH HOMOGENEOUS BRAKE STACK

[75] Inventors: John P. Nelson; Joseph F. Dernovshek; Hal E. Miller, all of Akron; Clifton A. Byers, Cuyahoga Falls, all of Ohio

[73] Assignee: The Goodyear Tire & Rubber Company, Akron, Ohio

Reexamination Request:
No. 90/000,646, Oct. 10, 1984

Reexamination Certificate for:
Patent No.: 3,650,357
Issued: Mar. 21, 1972
Appl. No.: 833,836
Filed: May 8, 1969

Related U.S. Application Data

[63] Continuation-in-part of Ser. No. 739,836, Jun. 25, 1968, abandoned.

[51] Int. Cl.$^4$ .................. F16D 55/36; F16D 69/00; F16D 13/52; B25G 3/28
[52] U.S. Cl. ........................... 188/71.5; 188/73.2; 188/251 R; 192/70.2; 192/107 M; 403/359
[58] Field of Search .......... 188/251 R, 251 M, 251 A, 188/218 H, 71.5, 73.2; 192/107 M

[56] References Cited

U.S. PATENT DOCUMENTS

| | | |
|---|---|---|
| 1,256,228 | 2/1918 | Hensley . |
| 1,547,190 | 7/1925 | Zabinski ................. 188/251 A |
| 1,717,393 | 6/1929 | Loughead ................. 188/251 A |
| 2,093,324 | 9/1937 | Lansing ................. 192/105 |
| 2,095,805 | 10/1937 | Frank ................. 188/18 A |
| 2,161,363 | 6/1939 | Malcolm ................. 188/245 |
| 2,239,134 | 4/1941 | Wellman ................. 75/22 |
| 2,248,530 | 7/1941 | Granger et al. ................. 308/241 |
| 2,379,767 | 7/1945 | Valentine ................. 188/25 TA |
| 2,388,123 | 10/1945 | Conradty ................. 188/25 TA |
| 2,542,545 | 2/1951 | Lyman ................. 188/218 XL |
| 2,850,118 | 9/1958 | Byers ................. 188/73.1 |
| 2,945,291 | 7/1960 | Ankeny et al. ................. 29/182.5 |
| 2,966,737 | 1/1961 | Spokes et al. ................. 29/182.5 |
| 3,014,884 | 12/1961 | Bray ................. 260/38 |
| 3,033,326 | 5/1962 | Byers ................. 188/251 M |
| 3,184,001 | 5/1965 | Reinsch et al. ................. 188/251 M |
| 3,210,303 | 10/1965 | Biggs ................. 260/19 |
| 3,237,731 | 3/1966 | BuBois ................. 188/218 XL |
| 3,261,440 | 7/1966 | Graham et al. ................. 192/113 B |
| 3,306,401 | 2/1967 | Dasse ................. 188/251 M |
| 3,421,913 | 1/1969 | Falcettoni ................. 106/36 |
| 3,452,844 | 7/1969 | Lallement ................. 188/218 XL |
| 3,473,637 | 10/1969 | Rutt ................. 188/251 A |
| 3,483,953 | 12/1969 | Bender ................. 188/218 XL |
| 3,550,740 | 12/1970 | LeBlanc et al. ................. 192/107 R |
| 3,552,533 | 1/1971 | Nitz et al. ................. 192/107 M |
| 3,605,967 | 9/1971 | Warren et al. ................. 192/107 R |
| 3,672,936 | 6/1972 | Ehrenreich ................. 117/466 G |
| 4,119,189 | 10/1978 | Ehrenreich ................. 192/107 M |

FOREIGN PATENT DOCUMENTS

| | | |
|---|---|---|
| 583464 | of 1933 | Fed. Rep. of Germany . |
| 674759 | 9/1937 | Fed. Rep. of Germany . |
| 766161 | of 1942 | Fed. Rep. of Germany . |
| 895135 | 3/1944 | France . |
| 967472 | 11/1950 | France . |
| 1140969 | of 1957 | France . |
| 1150190 | of 1957 | France . |
| 1258045 | of 1961 | France . |
| 1305763 | of 1962 | France . |
| 217300 | of 1942 | Switzerland . |
| 500482 | of 1939 | United Kingdom . |
| 865163 | of 1961 | United Kingdom . |
| 1092790 | 11/1967 | United Kingdom . |

OTHER PUBLICATIONS

Bowden et al, The Friction and Lubrication of Solids (1950).
Bowden et al, The Friction and Lubrication of Solids (1964).
Bowden, Recent Experimental Studies of Solid Friction, Proceedings of the Symposium on Friction and Wear (1959).
Shobert, Carbon Brushes, The Physics and Chemistry of Sliding Contacts (1965).
Rabinowicz, Friction and Wear of Materials (1965).
Carborundum, Carb-I-Tex Bulletin 112 (Nov. 1965).
Plattner, Subsystems Carried Over to 2707-300, Aviation Week & Space Technology (Dec. 16, 1968).

*Primary Examiner*—George E. A. Halvosa

[57] ABSTRACT

A lightweight disc brake utilizing homogeneous brake discs to provide heat absorbing characteristics superior to steel. The brake discs are made from graphite and/or carbon materials where the graphite and/or carbon acts as the primary heat sink and with the graphite-carbon disc itself acting as the basic friction material. The discs are preferably in the shape of flat annular rings. Straps may be utilized in a segmented design or to reinforce drive lugs for torque transmittal. Strengthening and anti-oxidizing agents can be added to the discs.

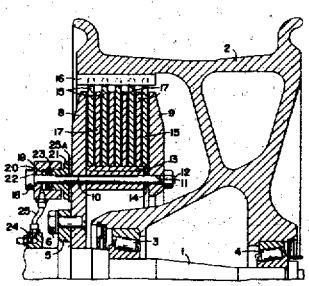

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 9 and 10 are cancelled.

Claims 1-6, 11, and 14-20 are determined to be patentable as amended.

Claims 7, 8, 12 and 13 dependent on an amended claim, are determined to be patentable.

New claims 21-26 are added and determined to be patentable.

1. [A] *An aircraft* disc brake which comprises [;]*:*
a rotatable body, a fixed axle *on an aircraft* rotatably supporting the body,
a stack of discs in the earth's atmosphere each having portions splined in aligned alternating relation respectively to the axle and the body, each disc characterized by being made from a carbon base material having low weight, high specific heat, and low thermal expansion properties, and having a friction coefficient of at least 0.10 between adjacent discs over the normal operating temperature range thereof, and
reinforcing means strengthening the splined portion of each disc so that each disc is capable of transmitting torque regardless of the direction of rotation of the disc[.]*.*
*whereby said aircraft disc brake is capable of braking an aircraft.*

2. An annular *aircraft disc* brake [disc] having high heat sink, stength, and friction properties which *comprises a stack of discs in the earth's atmosphere wherein each disc* is characterized by being made from a carbon base material to provide a friction coefficient of at least 0.1 when in engagement with [a similar] *an adjacent* disc in the earth's atmosphere, where the specific heat *of each disc* is at least 0.17 cal./gm./°C., and the density *of each disc* is greater than 1.45 grams per cubic centimeter, but less than 2.5 grams per cubic centimeter, and [which] *wherein each disc* includes notches therein to receive splines to achieve transfer of torque, and where the notches have parallel sides and withstand 5,000 p.s.i. for extended periods of time and 15,000 p.s.i. for short high peak loading periods of time, and a metallic strap insert attached to [the] *each* disc to extend across and strengthening each notch[.]*.*
*whereby said aircraft disc brake is capable of braking an aircraft.*

3. [A] *An aircraft* disc brake *that is subjected to high heat input generated by high aircraft deceleration requirements at high speeds and under great loads* which comprises:
a rotatable body,
a fixed axle *on an aircraft* rotatably supporting the body,
a stack of discs associated with the axle and body in a gaseous atmosphere, each disc characterized by being made from a carbon base material having low weight, high specific heat, and low thermal expansion properties, and having a friction coefficient of at least 0.10 between adjacent discs over the normal operating temperature range thereof,
reinforcing means strengthening and defining a plurality of splined portions for each disc so that each disc is splined in alternating relation respectively to the axle and the body and is capable of transmitting torque regardless of the direction of rotation of the body, and
means [to press the discs together] *for applying braking pressure to said stack of discs to cause said discs to be rubbed against each other to form a homogeneous stack of discs that absorbs the high heat input generated by the high aircraft deceleration requirements at high speeds and under great loads,*
*whereby said homogeneous stack of discs brakes said aircraft.*

4. [A] *An aircraft* disc brake which comprises a rotatable body substantially open to a gaseous atmosphere,
a fixed axle *on an aircraft* rotatably supporting the body,
a stack of discs *in a gaseous atmosphere* splined in alternating relation respectively to the axle and the body, and
means to press the discs together which is characterized by each disc being made from a carbon-based material of substantially uniform composition in cross section having low weight, high specific heat and low thermal expansion properties, and having a friction coefficient of at least 0.10 between adjacent discs over the normal temperature operating range thereof[.]*.*
*whereby said aircraft disc brake is capable of braking an aircraft.*

5. A disc brake according to claim 1 where high temperature strengthening agents from a group including tungsten, and silicon carbide are added so as to comprise less than 25 percent by volume of the discs, and which includes an anti-oxidizing coating covering all [non-rubbed] *non-rubbing* portions of each disc which is from a group of materials comprising electrolysis nickel and electro-plated chrome; electro-plated nickel and chrome flash; chromium and chromium oxide; silicon carbide; silicon metal; electro-plated nickel over copper; and electroplated cadmium over nickel.

6. A disc brake according to claim 5 where the discs are slotted to provide the splined relationship with the axle and body and where the clearances of the slots to the splines is less than [0.25] *0.025* inches, and where the antioxidizing additive is a thin coating covering the [non-rubbed] *non-rubbing* surface of the disc.

11. [A] *An aircraft* disc brake which comprises:
a rotatable body,
a fixed axle *on an aircraft* rotatably supporting the body,
a stack of discs in a gaseous atmosphere each having portions splined in aligned alternating relation respectively to the axle and the body, each disc characterized by being made from a carbon base material having low weight, high specific heat, and low thermal expansion properties, and having a friction coefficient of at least 0.10 between adjacent discs over the normal operating temperature range thereof, reinforcing means strengthening the splined portion of each disc so that each disc is capable of transmitting torque regardless of the direction of rotation of the body, and means to press the discs together[.],

*whereby said aircraft disc brake is capable of braking an aircraft.*

14. An annular *aircraft disc* brake [disc] having high heat sink and friction properties and being lightweight which *comprises a stack of discs in a gaseous atmosphere wherein each disc* is characterized by being made from a carbon base material to provide a coefficient of at least 0.1 when in engagement with [a similar] *an adjacent* disc in a gaseous atmosphere, where the specific heat *of each disc* is at least 0.17 cal./gm./°C. across the normal operating temperature range of the disc, and [which] *wherein each disc* includes portions therein to receive splines to achieve transfer of torque, and where the portions can withstand 5,000 p.s.i. for extended periods of time and 15,000 p.s.i. for short high peak loading periods of time, and individual reinforcing means attached to [the] *each* disc to extend across and strengthen each portion for torque transfer regardless of the direction of rotation of the disc[.], *whereby said aircraft disc brake is capable of braking an aircraft.*

15. The annular *aircraft disc* brake [disc] according to claim 14 wherein the torque transmitting portions of [the] *each* disc comprise notches in one circumference of the disc to receive torque transmitting splines, the center portions of the reinforcing means covering the sides and bottom of the notch.

16. The annular *aircraft disc* brake according to claim 14 further including metallic straps extending along the circumference of [the] *each* disc between adjacent reinforcing means, the straps overlying a portion of the reinforcing means, and means securing [to] the metallic straps to the reinforcing means and to the disc.

17. The annular *aircraft disc* brake [disc] according to claim 14 wherein the torque transmitting portions of [the] *each* disc comprise lugs projecting from one circumference of the disc to be received in splined relation in torque transmitting grooves, the center portions of the reinforcing means covering the sides and extending over the central portions of the lugs.

18. The annular *aircraft disc* brake [disc] according to claim 17 wherein the lugs each consist of a metallic member secured to the center portion of the reinforcing members.

19. [A disc] *The aircraft disc brake* according to claim 14 [having] *wherein* the carbon base *material of each disc* makes up at least about 75 percent of the volume of the disc, and where the reinforcing means *for each disc* is a stamped metallic insert and riveted into position on the outer periphery of the disc a distance on each side of each notch at least equal to the length of the notch.

20. [A disc] *The aircraft disc brake* according to claim 19 [where the] *wherein each* disc is divided into a plurality of arcuate segments held in adjacent relation butted at their ends by the metallic insert for each notch.

21. The aircraft disc brake of claim 1 wherein at least about 75% of the total volume of each disc is made up of graphite and carbon.

22. The aircraft disc brake of claim 4 wherein at least about 75% of the total volume of each disc is made up of graphite and carbon.

23. The aircraft disc brake of claim 14 wherein at least about 75% of the total volume of each disc is made up of graphite and carbon.

24. The aircraft disc brake of claim 21 wherein each disc is further characterized by a flexural strength greater than 5000 p.s.i., a density greater than 1.45 grams/cm³, a specific heat greater than 0.17 cal./gm./°C. across the normal operating temperature range of the disc, a conductivity greater than 0.04 calories per second per square centimeter per centimeter per degree centigrade, and a friction coefficient greater than 0.10 between adjacent discs over the normal temperature operating range of the disc.

25. The aircraft disc brake of claim 22 wherein each disc is further characterized by a flexural strength greater than 5000 p.s.i., a density greater than 1.45 grams/cm³, a specific heat greater than 0.17 cal./gm./°C. across the normal operating temperature range of the disc, a conductivity greater than 0.04 calories per second per square centimeter per centimeter per degree centigrade, and a friction coefficient greater than 0.10 between adjacent discs over the normal temperature operating range of the disc.

26. The aircraft disc brake of claim 23 wherein each disc is further characterized by a flexural strength greater than 5000 p.s.i., a density greater than 1.45 grams/cm³, a specific heat greater than 0.17 cal./gm./°C. across the normal operating temperature range of the disc, a conductivity greater than 0.04 calories per second per square centimeter per centimeter per degree centigrade, and a friction coefficient greater than 0.10 between adjacent discs over the normal temperature operating range of the disc.

* * * * *